Aug. 1, 1967 M. E. HODGES 3,334,247
PULSE STRETCHER WITH MEANS PROVIDING ABRUPT
OR SHARP TRAILING EDGE OUTPUT
Original Filed Dec. 16, 1960

INVENTOR:
MERWYN E. HODGES,
BY Albert S. Richardson Jr.
ATTORNEY

United States Patent Office 3,334,247

Patented Aug. 1, 1967

3,334,247

PULSE STRETCHER WITH MEANS PROVIDING ABRUPT OR SHARP TRAILING EDGE OUTPUT

Merwyn E. Hodges, Broomall, Pa., assignor to General Electric Company, a corporation of New York Original application Dec. 16, 1960, Ser. No. 76,209, now Patent No. 3,176,190, dated Mar. 30, 1965. Divided and this application Nov. 24, 1964, Ser. No. 413,580

7 Claims. (Cl. 307—88.5)

This is a division of patent application Ser. No. 76,209, filed Dec. 16, 1960, which application matured as Patent No. 3,176,190 on Mar. 30, 1965.

The present invention relates to electric time delay circuits, and more particularly it relates to refinements in a time delay circuit that is disclosed and claimed in Patent No. 2,879,453 granted to N. A. Koss and myself on Mar. 24, 1959.

A general object of my invention is the provision of improved circuit means for delaying the termination of a D-C signal for an accurately determinable length of time, the signal termination being effected with unusual abruptness when the time delay has elapsed.

A more specific object of the present invention is to provide an asymmetrical time delay circuit especially well suited for performing the "symmetry adjusting" function in the phase-comparison protective relaying system that is the subject matter of my original case, S.N. 76,209.

In carrying out my invention in one form, a source of unipolarity input signals and a pair of output terminals are interconnected by means of an electric energy storing circuit comprising a series-connected inductance element and a parallel-connected capacitor, whereby the magnitude of the output signal that appears across the output terminals will change in delayed response to input signal magnitude changes. In order to obtain unusually abrupt termination of the output signal when a predetermined interval of time has elapsed after termination of an input signal, I connect in parallel with the input signal source means responsive to a sudden decrease in magnitude of the input signal for providing a reduced impedance path for capacitor discharge current. In one aspect of the invention, the operation of the foregoing time delay circuit is made asymmetrical by connecting a diode in parallel circuit relationship with the inductance element, whereby the output signal magnitude will increase immediately in response to a sudden increase in input signal magnitude.

Figure 1:
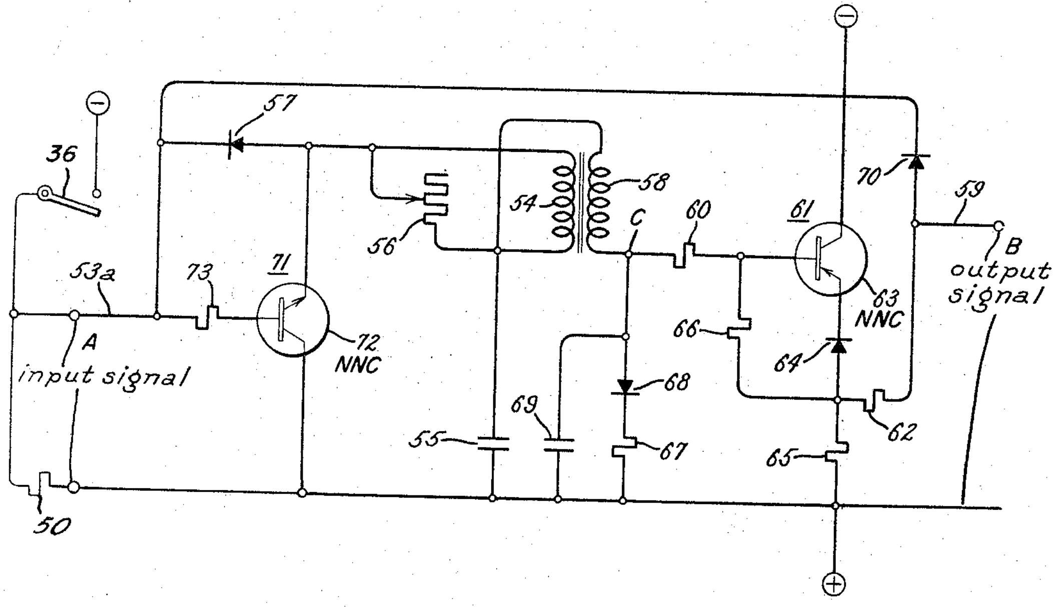
Figure 2:
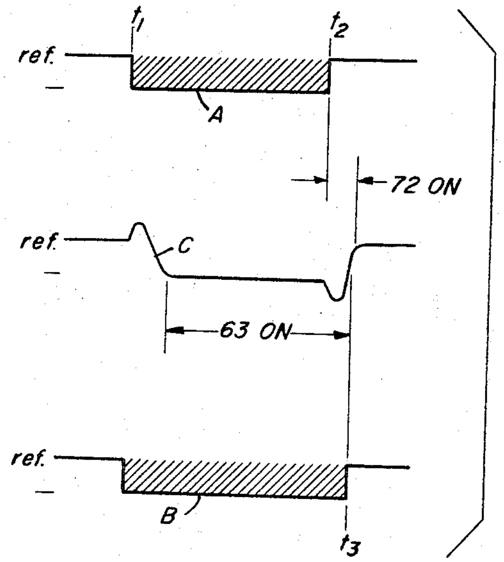

My invention will be better understood in its various objects and advantages will be more fully appreciated from the following description taken in conjunction with the accompanying drawing in which:

FIG. 1 is a schematic diagram of a time delay circuit embodying the invention; and FIG. 2 is a chart depicting typical voltage waveforms with respect to time for the illustrated circuit.

In the drawing, the reference character 53*a* identifies a conductor or terminal to which a unipolarity input signal A is intermittently applied. The input signal when present will cause the conductor 53*a* to be energized by a substantially constant-magnitude potential of negative polarity with respect to a predetermined reference level of potential. The reference level of potential is that of a reference bus connected to the positive terminal of a suitable source of D-C supply voltage. I have used the encircled positive and negative symbols "+" and "−" to represent the terminals of a single source of regulated D-C supply voltage, with the relatively positive terminal (+) comprising the common reference bus for the transistor circuits illustrated. This bus also serves as common input and output terminals for my time delay circuit. The magnitude of the supply voltage preferably is 25 volts.

As is explained in my original case, the input signal that is applied between the conductor 53*a* and the reference bus may comprise an intermittent keying signal the successive periods of which have a time correspondence to half cycles of given polarity of a single-phase, line-frequency A-C quantity derived from a 60 cycles-per-second electric power transmission line under line fault conditions. Such an arrangement has been depicted in simplified form as a switch 36 connected between the negative supply voltage terminal and the conductor 53*a*, the latter being coupled to the reference bus via a resistor 50. The function of the time delay means shown in the present drawing and described below is to produce, at an output terminal or conductor 59, an intermittent unipolarity output signal B corresponding to the input signal A except having lengthened periods, that is, having periods slightly longer than one-half cycle in duration. (The term "period" as it is used in this specification with reference to intermittent or periodic signals, is meant to identify only a portion of time or an interval during which such a recurring signal is in existence.)

The illustrated time delay means is a refinement of an arrangement disclosed and claimed in the aforesaid Patent No. 2,879,453. It comprises an energy storing circuit which includes a series-connected inductance element 54 and a parallel-connected capacitor 55. The inductance element 54 and capacitor 55 are connected in series circuit relationship between the reference bus and the conductor 53*a*. An adjustably tapped resistor 56 is connected across element 54, and impedance means, preferably comprising a diode 57 poled as shown, is serially inserted between the element 54 and conductor 53*a*. The value of capacitance, measured in microfarads, of the capacitor 55 is preferably chosen to be about equal to the value of inductance, measured in henries, of the inductance element 54.

The inductance element 54 is one of two magnetically and conductively coupled windings 54 and 58 comprising an autotransformer, and the secondary winding 58 is provided with about four times the number of turns as winding 54. The secondary winding 58 and capacitor 55 are serially connected between the reference bus and the conductor 59 by means including: a current limiting resistor 60; signal amplifying means 61; and impedance means preferably comprising a relatively small resistor 62. The ultimate output signal developed by the illustrated circuit appears between the conductor 59 and the reference bus.

As can be seen in the drawing, the signal amplifying means 61 comprises a PNP transistor 63. The collector of this transistor is connected directly to the negative supply voltage terminal, while the emitter is connected to the reference bus through a silicon diode 64 and an emitter follower resistor 65. The base electrode of transistor 63 is connected to the current limiting resistor 60, and there is a base resistor 66 connected between resistors 65 and 60 as shown. The silicon diode 64 is poled in agreement with the emitter-base junction of the transistor 63. This diode is provided to ensure that the transistor does not operate as a result of collector leakage current. Since a silicon diode inherently presents a relatively high impedance to the passage of a small quantity of forward current, the greater portion of the collector leakage current of transistor 63 prefers to follow a parallel path through the base resistor 66, thereby avoiding amplification which would take place if it were able to follow a path through the emitter-base junction of the transistor. As a result, the transistor 63 remains normally inactive and is labeled NNC (for "normally nonconducting"). The emitter-base junction of this transistor does become forward biased, and the transistor is consequently rendered conductive, when there is a negative potential corresponding to the input signal magnitude at the output end of the autotransformer winding 58.

In order safely to limit the amount of positive-going voltage to which the base electrode of transistor 63 is subjected during operation of the time delay circuit, a relatively small resistor 67 and an appropriately poled diode 68 are connected in series between the reference bus and the output end of the secondary winding 58 of the time delay means. A surge suppressing capacitor 69 of relatively small capacitance compared to that of the capacitor 55 is connected across the series combination of resistor 67 and diode 68.

The operation of the time delay means comprising capacitor 55 and the autotransformer windings 54 and 58 to provide at the output end of 58 a voltage whose magnitude changes in delayed response to changes in the magnitude of the unipolarity input voltage applied to conductor 53*a*, is fully explained in Patent 2,879,453 referred to above. Briefly stated, the rate of charging or discharging of the capacitor 55, in response to a sudden increase or decrease in magnitude of the applied voltage, is limited by the magnetizing impedance of winding 54. The resulting change of magnetic flux in the autotransformer induces a voltage across both of its windings which surges to a peak and then rapidly decays toward zero as the capacitor voltage approaches its new level of magnitude. The output voltage comprises the sum of the capacitor voltage and the induced voltage of winding 58. The magnitude and polarity of this induced voltage, as it surges to its peak, are such that the output voltage C, measured at the output end of winding 58, momentarily swings positive with respect to the reference bus whenever the negative voltage at conductor 53*a* is increased, whereas it increases in a negative sense in response to any sudden decrease in magnitude of the negative applied voltage. Capacitor 69 serves to reduce the magnitude but extend the duration of this negative-going surge of output voltage.

The adjustably tapped resistor 56 connected in parallel with winding 54 of the autotransformer provides convenient means for changing the amount of time required to charge or discharge the capacitor 55. A very accurate time delay is obtained by using the above-described arrangement because of the rapid rate of change of the output voltage C as it approaches its new magnitude level a short time after a change in the magnitude of the applied voltage.

The time delay means just described is made unilaterally effective by connecting a diode 70 in parallel therewith, as is shown in the drawing. The diode 70, which is connected between conductors 53*a* and 59, is so poled that the potential of conductor 59 will never be appreciably less negative than the potential of conductor 53*a*. It is apparent, therefore, that a sudden increase in the negative potential A of conductor 53*a*, as occurs at the beginning of each input signal period, will be immediately reflected by a corresponding increase in the negative-going output signal B developed at conductor 59. In other words, by shunting the energy storing circuit of the time delay means, diode 70 enables the output signal to be initiated without time delay at the beginning of each input signal period and consequently the output and input signals exist contemporaneously.

On the other hand, at the conclusion of each input signal period, the time delay means is effective to prolong the output signal and delay its termination for a predetermined short interval of time. When the voltage at conductor 53*a* suddenly decreases at the end of each input signal period the energy storing circuit of the time delay means operates in the manner already explained to sustain a negative output voltage C for a predetermined length of time. Transistor 63 of the signal amplifier 61, having previously been conductive, continues in a conductive state until there is insufficient negative potential at the output end of winding 58 to maintain a forward bias on its emitter-base junction. As long as transistor 63 is conductive, the conductor 59 emanating from the time delay circuit is energized, and consequently the output signal B is sustained, even though the input signal A has stopped and conductor 53*a* is deenergized. But as soon as the output C of the time delay means has fallen below the lowest level at which it can effectively maintain a forward bias on the emitter-base junction of transistor 63, this transistor becomes non-conductive and the potential of conductor 59 changes to a level nearly the same as that of the reference bus. The parameters of the time delay means are selected so that the time which elapses before the output signal at conductor 59 terminates, following the conclusion of each period of the input signal, just corresponds to the interval of delay desired.

Unusually accurate timing by the time delay circuit and added abruptness in the termination of the prolonged output signal are obtained, in accordance with my invention, by providing means for increasing the rate of decay of the voltage across capacitor 55 and the autotransformer winding 58 as it decreases to less than its lowest effective level of magnitude. As is shown in the drawing, the means referred to comprises a normally inactive asymmetrically conductive circuit 71 which is connected across the series combination of capacitor 55 and winding 54 to provide, when activated, a relatively low-impedance path for the flow of discharge current from capacitor 55. In other words, when capacitor 55 begins to discharge under conditions of decreasing applied voltage, the low-impedance circuit 71 becomes effective to shunt the impedance across the source of input signals, thereby enabling the capacitor 55 to discharge at a faster rate than would otherwise be achieved.

Preferably the circuit 71 comprises an NPN transistor 72 whose collector is connected to the reference bus. The emitter-base junction of transistor 72, in series with a base resistor 73, is connected in parallel-circuit relationship with the diode 57, the emitter-base junction being poled in opposition to the direction of forward current flow through the diode 57. Thus, the emitter-base junction of transistor 72 is forward biased and this normally non-conducting (NNC) transistor is activated only when discharge current begins flowing from the capacitor 55, through the reference bus and the input signal source, conductor 53*a*, and resistor 73, and into the base electrode of the transistor. Under such a condition, which occurs at the conclusion of each input signal period, the transistor 72 is rendered conductive and provides a relatively low-impedance path in parallel with the source for the flow of discharge current. FIG. 2 may be referred to for a better understanding of the operation of the timing means disclosed hereinbefore. An input signal A is applied at time $t_1$, and an output signal B is simultaneously provided. The output signal continues so long as the input signal persists and for a precisely determined interval thereafter. In FIG. 2 the input signal is shown terminating at $t_2$, while the output signal B continues until $t_3$. The interval between $t_2$ and $t_3$ is very precise because of the unusually high rate of decay of the voltage C at the output of the energy storing circuit when this interval expires. The increased rate of decay of voltage C is the result of the low impedance path provided by the transistor 72 upon termination of the input signal A.

While I have shown and described a preferred form of my invention by way of illustration, many modifications will occur to those skilled in the art. I contemplate, therefore, by the claims which conclude this specification to cover all such modifications which fall within the true spirit and scope of my invention.

What I claim as new and desire to secure by Letters Patent of the United States is:

1. In a time delay circuit: a pair of input terminals adapted to be energized by a unipolarity input voltage;

a capacitor; inductive means having first and second windings and including means for magnetically and conductively coupling said windings together; means serially connecting the capacitor and the first winding of said inductive means to said input terminals; a pair of output terminals; means coupling the second winding of said inductive means and said capacitor in series circuit relationship across said output terminals; and means connected across said input terminals for providing, in response to the deenergization of the input terminals by said input voltage, a relatively low-impedance conductive path in parallel with said capacitor and said first winding.

2. Improved time delay means adapted to be connected to a source of unipolarity input voltage for providing a unipolarity output voltage the magnitude of which changes in delayed response to changes in the magnitude of said input voltage, the time delay means having an input terminal, an output terminal, a common reference terminal, an inductance element connected between said input and output terminals, and a capacitor connected between said input and reference terminals, wherein the improvement comprises: a normally inactive asymmetrically conductive circuit connected between said input and reference terminals in parallel with the source of input voltage, said parallel circuit being poled in agreement with the polarity of the input voltage and being constructed and arranged for activation in response to a sudden decrease in the magnitude of the input voltage to provide a relatively low impedance path for the flow of discharge current from said capacitor.

3. The improved time delay means of claim 2 in which a diode is connected between said input and output terminals in parallel circuit relationship with the inductance element, said diode being poled so as to enable the output voltage magnitude to increase immediately in response to a sudden increase in the magnitude of the input voltage.

4. In a time delay circuit: a pair of input terminals adapted to be energized by a unipolarity input voltage; a pair of output terminals; said pairs of terminals being interconnected by means including an electric energy storing circuit for providing at said output terminals a unipolarity output voltage the magnitude of which changes in delayed response to changes in the magnitude of the voltage applied to said input terminals, said energy storing circuit including a series-connected inductance element and a parallel-connected capacitor; and means for increasing the rate at which the output voltage can decrease when it decreases in delayed response to a decrease in the magnitude of the input voltage comprising a transistor having a collector, emitter and base electrode, said collector being connected to one of said input terminals, impedance means serially connected between the energy storing circuit and the other input terminal, and means connecting the emitter-base junction of said transistor in parallel-circuit relationship with said impedance means, said emitter-base junction being poled in opposition to the normal direction of current flow through the impedance means.

5. The time delay circuit of claim 4 in which a diode is connected between input and output terminals of corresponding polarity in parallel circuit relationship with the inductance element of said energy storing circuit, said diode being poled so as to enable the output voltage magnitude to increase immediately in response to an increase in the magnitude of the input voltage.

6. In a time delay circuit: a pair of input terminals adapted to be energized by a unipolarity voltage; first and second capacitors; inductive means having first and second windings and including means for magnetically and conductively coupling said windings together; means including said first winding connecting said first capacitor to said input terminals, whereby the first capacitor is charged in response to energization of the input terminals by said input voltage; means serially connecting said second winding and the first capacitor to said second capacitor, whereby a unipolarity voltage determined by the voltage of the first capacitor is developed across the second capacitor; and means disposed between the first capacitor and the input terminals responsive to discharge current flowing from the first capacitor, in response to deenergization of the input terminals by said input voltage, for providing a relatively low-impedance conductive path in parallel with said input terminals for the flow of said discharge current.

7. The time delay circuit of claim 6 in which the second capacitor is coupled to a pair of output terminals, series-connected impedance means is disposed between the second capacitor and said output terminals, and input and output terminals of corresponding polarity are interconnected by a diode so poled as to enable the voltage across said output terminals to increase immediately in response to the energization of the input terminals by said input voltage.

References Cited

UNITED STATES PATENTS

| | | | |
|---|---|---|---|
| 3,053,994 | 9/1962 | Heijn et al. | 307—88.5 |
| 3,067,344 | 12/1962 | Branum et al. | 307—88.5 |
| 3,158,751 | 11/1964 | Nelson | 307—88.5 |

ARTHUR GAUSS, *Primary Examiner.*

J. S. HEYMAN, *Assistant Examiner.*